Oct. 24, 1967 K. W. CATTERMOLE 3,349,177
SYSTEM FOR TRANSMITTING PULSE CODE GROUPS OR COMPLEMENTS
THEREOF UNDER CONTROL OF INDEPENDENT BINARY SIGNAL
Filed April 28, 1964 2 Sheets-Sheet 1

Inventor
KENNETH W. CATTERMOLE
By [signature]
Attorney

Inventor
KENNETH W. CATTERMOLE
By Percy P. Lantzy
Attorney

United States Patent Office 3,349,177

Patented Oct. 24, 1967

3,349,177

SYSTEM FOR TRANSMITTING PULSE CODE GROUPS OR COMPLEMENTS THEREOF UNDER CONTROL OF INDEPENDENT BINARY SIGNAL

Kenneth William Cattermole, London, England, assignor to International Standard Electric Corporation, New York, N.Y., a corporation of Delaware Filed Apr. 28, 1964, Ser. No. 363,117

Claims priority, application Great Britain, May 24, 1963, 20,847/63

13 Claims. (Cl. 178—68)

ABSTRACT OF THE DISCLOSURE

A coder generates code combinations including binary code signals of restricted disparity representing samples of a signal wave and an additional digit always of a first binary condition. The binary condition of an independent binary signal determines whether the code combinations or their complements are provided for transmission. The binary condition of the additional digit in the receiver reproduces the additional binary signal whose binary condition in turn determines whether the received code combinations or their complements are provided for utilization.

This invention relates to pulse code modulation systems of communication, hereinafter referred to as P.C.M. systems.

According to the invention there is provided a P.C.M. system in which samples of a signal wave to be conveyed over the system are represented by a restricted-disparity binary code and are transmitted in combination with an independent binary signal, in which said binary signal is conveyed by the condition of a digit additional to those representing the sample and in which a complete code combination is transmitted in its true form when said binary signal has a first signification and is transmitted in its complemented form when said binary signal has a second signification, whereby the condition—Mark or Space—of said additional digit indicates the signification of said independent binary signal and also whether the portion of the complete code combination representing the sample is in its true form or its complementary form, and whereby the combination as transmitted has a disparity no greater than has the portion thereof which represents the sample when in its true form.

In this specification the term "restricted-disparity" is used to define a binary code, where each code combination is made up of "marks" and "spaces," and in which the difference between the number of marks and spaces in any code combination does not exceed a constant value. Thus, an 8-digit code is termed a "restricted-disparity" code when the number of marks in any code combination is, for example 3 or 4, while in a 9-digit "unit-disparity" code the number of marks must always be 4 or 5. In contrast, an 8-digit code in which the number of marks was always 4 would be termed a "zero-disparity" code.

Figure 1:
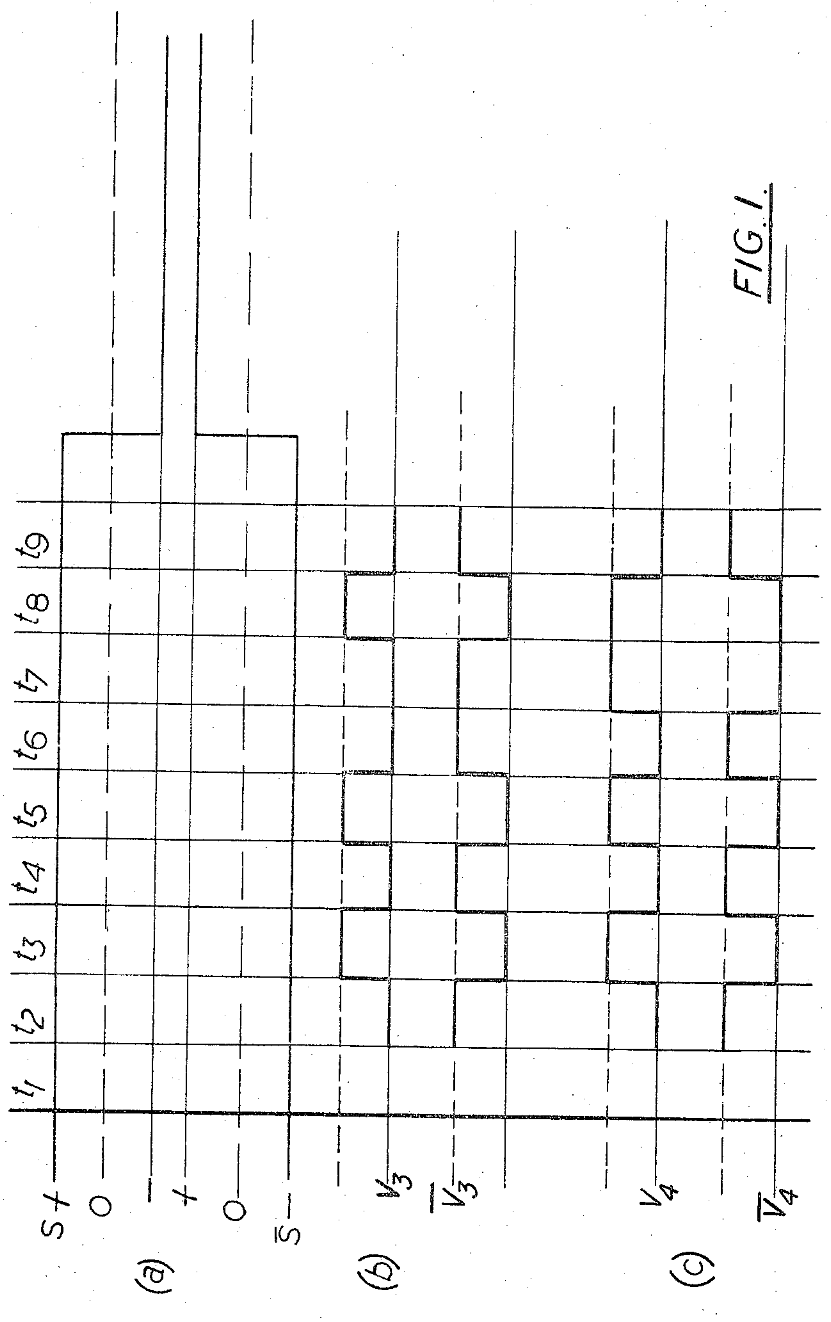
Figure 2:
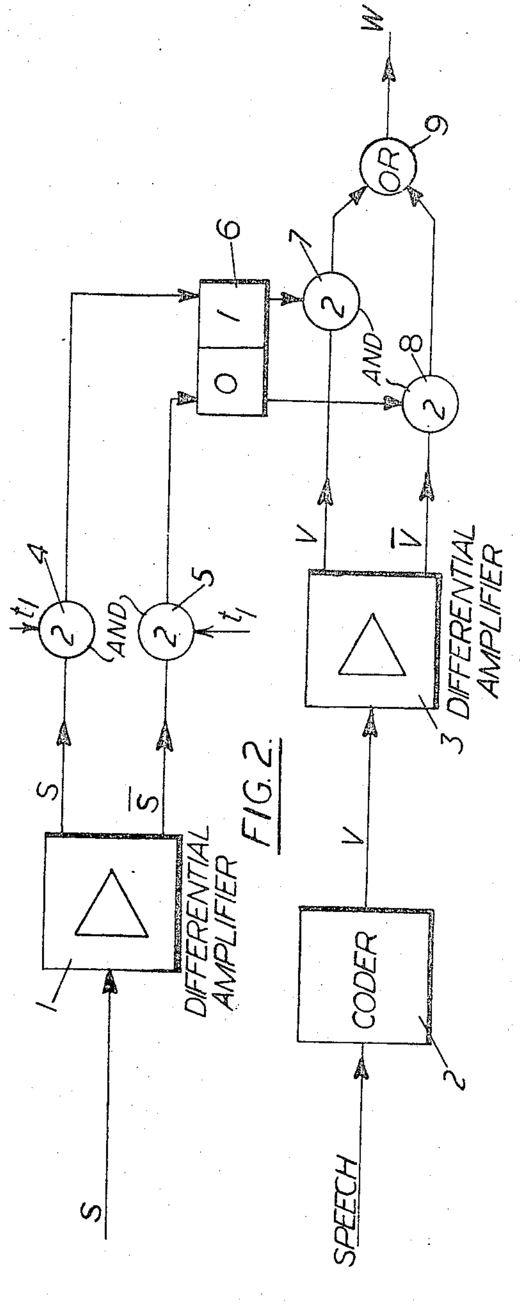
Figure 3:
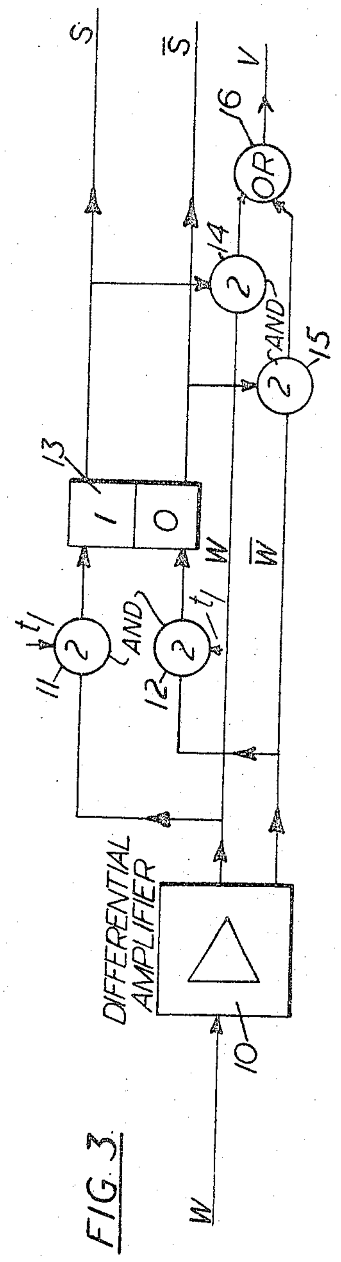

An embodiment of the invention is now described with reference to the accompanying drawings in which FIG. 1 is a timing diagram illustrating certain of the wave forms used in a P.C.M. system, FIG. 2 is a block diagram of a part of a transmitter for a P.C.M. system, and FIG. 3 is a block diagram of part of a receiver for a P.C.M. system.

In the system to be described, it is assumed that the information to be transmitted comprises samples of a speech waveform, quantized and coded into an 8-digit restricted-disparity code in which each code combination has 3 or 4 marks, and an independent binary signal which, for example, might represent the condition of a telephone subscriber's line, i.e. whether or not a connection is being maintained. This independent binary signal is conveyed as an extra digit additional to the 8-digit code of the the speech signal, thus making the complete code combination transmitted over the P.C.M. channel a 9-digit code.

Reference to the timing diagram of FIG. 1 will show that the time for one complete 9-digit code combination has been subdivided into 9 periods $t_1$–$t_9$, corresponding to the 9 digits. The independent binary signal S, FIG. 1(*a*), representing the condition of the subscriber's line, persists either as a positive or negative signal. In this case it is assumed that it is a positive signal S, indicating that the connection is being maintained, certainly until after the passing of period $t_1$.

The speech sample which has been quantized and coded may be either a code combination of 3 marks and 5 spaces, such as the waveform $V_3$, FIG. 1(*b*), or a code combination of 4 marks and 4 spaces, such as the waveform $V_4$, FIG. 1(*c*). In both cases the 8 digits making up the code combination are timed to occur in periods $t_2$–$t_9$.

An additional digit has now to be added to the code combination in period $t_1$, representing the binary signal S. If such a digit is a mark, to signify that S is positive, the resultant code combination will be MSMSMSMMS if it is added to $V_4$. But if the extra digit were a space to signify that S is negative, then the resultant code combination will be SSMSMSSMS if it is added to $V_3$. Thus, it can be seen that the resulting 9-digit code can have between 3 and 5 marks, making it a code having a possible disparity of 2.

In practice it is desirable to have as low a disparity as possible, since a high disparity code provides an unbalanced signal. This means that the proportion of marks to spaces over a period of time may be so unbalanced that the signal is at that time unduly vulnerable to interference and so liable to error. A balanced or nearly balanced signal is easier to transmit and receive, and the risk of errors in the signal is reduced.

The present invention seeks to restrict the disparity of the code even when a ninth digit is added, within a range not greater than that of the original 8-digit code, by transmitting the 8-digit code in either its true form or its complemented form, depending on the value of the added ninth digit.

Thus, to take the case illustrated in FIG. 1, the binary signal S can have either of two values, S which is positive, or $\overline{S}$ which is negative. Also the codes $V_3$ and $V_4$ can have either of two forms, $V_3$ and $V_4$ which are the true codes, or $\overline{V_3}$ and $\overline{V_4}$ which are the complemented (inverted) codes.

The complemented codes $\overline{V_3}$ and $\overline{V_4}$ are quite simply obtained by the use of balanced-output ampliers, as described below. The condition S is repersented by a mark, and the condition $\overline{S}$ is represented by a space, as described above.

Taking now the possible combination of S with $V_3$ and $V_4$, the following combinations arise:

(a) When S is represented by a mark, the remaining 8 digits of $V_3$ and $V_4$ are transmitted in their true forms, and the 9-digit code. Including $V_3$ becomes

MSMSMSSMS including $V_4$ becomes MSMSMSMMS.

(b) When $\overline{S}$ is represented by a SPACE, the remaining 8 digits of $V_3$ and $V_4$ are transmitted in their complemented forms, and the 9-digit code. Including $\overline{V_3}$ becomes SMSMSMMSM; including $\overline{V}_4$ becomes SMSMSMSSM.

It will be seen that in the case of the 9-digit codes transmitted, those including $V_3$ and $\overline{V}_4$ have 4 marks, while those including $\overline{V}_3$ and $V_4$ have 5 marks. Thus, the resulting 9-digit code still has unit-disparity. Furthermore, at the receiver it is only necessary to note the condition—mark or space—of the additional ninth digit, which is transmitted first in period $t_1$, to ascertain (a) the significance of S;
(b) whether the remaining 8 digits have been transmitted true or complemented.

A transmitter for a P.C.M. system using such a 9-digit code as that described above is illustrated in FIG. 2.

The independent binary signal S forms the input to a balanced output amplifier 1, which produces two outputs of equal amplitude but opposite sense. The output $\overline{S}$ is of the same sense as the input S, and the output 1 is of the opposite sense to the input S. The speech waveform is sampled, quantized and coded into a unit-disparity 8-digit code by the coder 2. In practice this coder is arranged to generate a 9-digit code, of which the first digit, in period $t_1$, is always a mark, and the remaining 8 digits in periods $t_2$–$t_9$ are the 8-digit code having unit-disparity.

The 9-digit output V from the coder 2 is applied as the input to the differential amplifier 3, which produces two outputs of equal amplitude but opposite sense. The output V is of the same sense as the input V and the output $\overline{V}$ is of the opposite sense to the input V. It follows, therefore, that $\overline{V}$ is in reality the complement of the code V generated by the coder 2. The appropriate output V or $\overline{V}$ is transmitted according to the significance of the binary signal S.

This is achieved by gating the outputs S and $\overline{S}$ at the 2-input AND gates 4 and 5, which will only open when a positive output for either S or $\overline{S}$ appears in conjunction with a timing pulse in period $t_1$, and which in turn control a flip-flop 6. The output of the flip-flop 6 is used to control one of the 2-input AND gates 7 and 8 and, thereby, selects the appropriate 9-digit code V or $\overline{V}$, which in turn operates the "OR" gate 9 and is thereby sent out as a transmitted signal W.

If the independent binary signal S has a positive value, then the positive output S of the amplifier 1 will cause the flip-flop 6 to register a 0–1 as shown, and this causes the output V from the amplifier 3 to be transmitted as the signal W.

If however, the independent binary signal S has a negative value, then $\overline{S}$ will be the positive output of amplifier 1, and the flip-flop 6 will register a 1–0 opposite to that shown, and so select output $\overline{V}$ from the amplifier 3 to be transmitted as the signal W.

Thus, it can be seen that whenever the first digit in period $t_1$ is complemented, or inverted from a mark to a space in accordance with the significance of the binary signal, the remaining 8 digits are also complemented, or inverted. This is in agreement with the procedure outlined above with respect to FIG. 1.

In the case of the receiver shown in FIG. 3, the received signal W is applied to the differential amplifier 10, which produces the outputs W and $\overline{W}$. These are fed to the 2-input AND gates 11 and 12 which are opened in period $t_1$ and set the flip-flop 13 accordingly. The flip-flop 13 indicates the condition of binary signal S, and also controls the AND gates 14 and 15, which select the appropriate signal W or $\overline{W}$. This signal W or $\overline{W}$ operates the OR gate 16 which allows the selected output to be passed to the decoder as the correct code V.

Thus, if in the received signal W the first digit is a mark, gate 11 will open in period $t_1$, setting the flip-flop 13 as shown. Therefore, the flip-flop 13 output will indicate that the binary signal S is positive, and that the signal W corresponds to the original code V.

If the first digit received was, however, a space, the condition of the flip-flop 13 would be reversed, the output thereof would indicate that the binary signal S was negative, and $\overline{W}$ should be passed to the decoder, since the original code had been transmitted complemented and must, therefore, be reinverted to its true form.

What I claim is:

1. A pulse code modulation system in which samples of a signal wave to be conveyed over said system are represented by a restricted-disparity binary code signal comprising:

a first source of code combinations including said code signals and an additional digit always in a first binary condition;

a second source of an independent binary signal having either binary condition;

first means coupled to said first source and said second source responsive to said first binary condition of said binary signal to provide said code combinations unaltered for transmission and responsive to the second binary condition of said binary signal to provide the complement of said code combinations for transmission, said code combinations provided for transmission having a disparity no greater than the disparity of said code signals;

second means coupled to said first means responsive to the binary condition of said additional digit to reproduce said binary signal; and third means coupled to said second means responsive to said first binary condition of said reproduced binary signal to provide unaltered said unaltered code combinations for utilization and responsive to said second binary condition of said reproduced binary signal to provide the complement of said complemented code combinations for utilization.

2. A system according to claim 1, wherein said first means includes fourth means having two outputs coupled to said first source, one of said outputs providing said code combinations and the other of said outputs providing the complement of said code combinations, fifth means having two outputs coupled to said second source, one of said outputs providing said binary signal and the other of said outputs providing the complement of said binary signal, and sixth means coupled to said two outputs of said fourth means and said two outputs of said fifth means to provide the appropriate one of said code combinations and said complemented code combinations for transmission.

3. A system according to claim 2, wherein said sixth means includes a first flip-flop having its 1 input coupled to said one of said outputs of said fifth means and its 0 input coupled to said other of said outputs of said fifth means, a first AND gate coupled to the 1 output of said first flip-flop and said one of said outputs of said fourth means, a second AND gate coupled to the 0 output of said first flip-flop and said other of said outputs of said fourth means, and a first OR gate coupled to said first and second AND gates.

4. A system according to claim 3, wherein said second means includes seventh means having two outputs coupled to said first means, one of said outputs providing said unaltered code combinations and the other of said outputs providing said complemented code combinations, and a second flip-flop having its 1 input coupled to said one of said outputs of said seventh means and its 0 input coupled to said other of said outputs of said seventh means responsive to the binary condition of said additional digit to reproduce said binary signal.

5. A system according to claim 4, wherein said third means includes a third AND gate coupled to the 1 output of said second flip-flop and said one of said outputs of said seventh means, a fourth AND gate coupled to the 0 output of said second flip-flop and said other of said outputs of said seventh means, and a second OR gate coupled to said third and fourth AND gates.

6. A system according to claim 1, wherein said second means includes fourth means having two outputs coupled to said first means, one of said outputs providing said unaltered code combinations and the other of said outputs providing said complemented code combinations, and a flip-flop having its 1 input coupled to said one of said outputs and its 0 input coupled to said other of said outputs responsive to the binary condition of said additional digit to reproduce said binary signal.

7. A system according to claim 6, wherein said third means includes a first AND gate coupled to the 1 output of said flip-flop and said one of said outputs of said fourth means, a second AND gate coupled to the 0 output of said flip-flop and said other of said outputs of said fourth means, and an OR gate coupled to said first and second AND gates.

8. A pulse code modulation transmitter in which samples of a signal wave to be transmitted are represented by a restricted-disparity binary code signal comprising:

a first source of code combinations including said code signals and an additional digit always in a first binary condition;

a second source of an additional binary signal having either binary condition; and logic circuitry coupled to said first source and said second source responsive to said first binary condition of said binary signal to provide said code combinations unaltered for transmission and responsive to the second binary condition of said binary signal to provide the complement of said code combinations for transmission, said code combinations provided for transmission having a disparity no greater than the disparity of said code signals.

9. A transmitter according to claim 8, wherein said logic circuitry includes first means having two outputs coupled to said first source, one of said outputs providing said code combinations and the other of said outputs providing the complement of said code combinations, second means having two outputs coupled to said second source, one of said outputs providing said binary signal and the other of said outputs providing the complement of said binary signal, and third means coupled to said two outputs of said first means and said two outputs of said second means to provide the appropriate one of said code combinations and said complemented code combinations for transmission.

10. A transmitter according to claim 9, wherein said third means includes a flip-flop having its 1 input coupled to said one of said outputs of said second means and its 0 input coupled to said other of said outputs of said second means, a first AND gate coupled to the 1 output of said first flip-flop and said one of said outputs of said first means, a second AND gate coupled to the 0 output of said first flip-flop and said other of said outputs of said first means, and an OR gate coupled to said first and second AND gates.

11. A pulse code modulation receiver to receive unaltered and complemented code combinations including restricted-disparity binary code signals representing samples of a signal wave and an additional digit whose binary condition represents the binary condition of an independent binary signal, said code combinations having a disparity no greater than the disparity of said code signals comprising:

a source of said code combinations;

first means coupled to said source responsive to the binary condition of said additional digit to reproduce said binary signal; and second means coupled to said first means responsive to a first binary condition of said reproduced binary signal to provide unaltered said unaltered code combinations for utilization and responsive to the second binary condition of said reproduced binary signal to provide the complement of said complemented code combinations for utilization.

12. A receiver according to claim 11, wherein said first means includes a third means having two outputs coupled to said source, one of said outputs providing said unaltered code combination and the other of said outputs providing said complemented code combinations, and a flip-flop having its 1 input coupled to said one of said outputs of said third means and its 0 input coupled to said other of said outputs of said third means responsive to the binary condition of said additional digit to reproduce said binary signal.

13. A receiver according to claim 12, wherein said second means includes a first AND gate coupled to the 1 output of said flip-flop and said one of said outputs of said third means, a second AND gate coupled to the 0 output of said flip-flop and said one of said outputs of said third means, and an OR gate coupled to said first and second AND gates.

References Cited

UNITED STATES PATENTS

| | | | |
|---|---|---|---|
| 2,957,947 | 10/1960 | Bowers | 325—28 X |
| 2,961,482 | 11/1960 | Wieselman et al. | 325—32 X |
| 3,160,812 | 12/1964 | Scantlen | 178—66 X |

JOHN W. CALDWELL, *Acting Primary Examiner.*

J. T. STRATMAN, *Assistant Examiner.*